No. 722,618. PATENTED MAR. 10, 1903.
W. N. PELOUZE.
BLANK FOR SHEET METAL SCALE FRAMES.
APPLICATION FILED MAY 7, 1902.
NO MODEL.
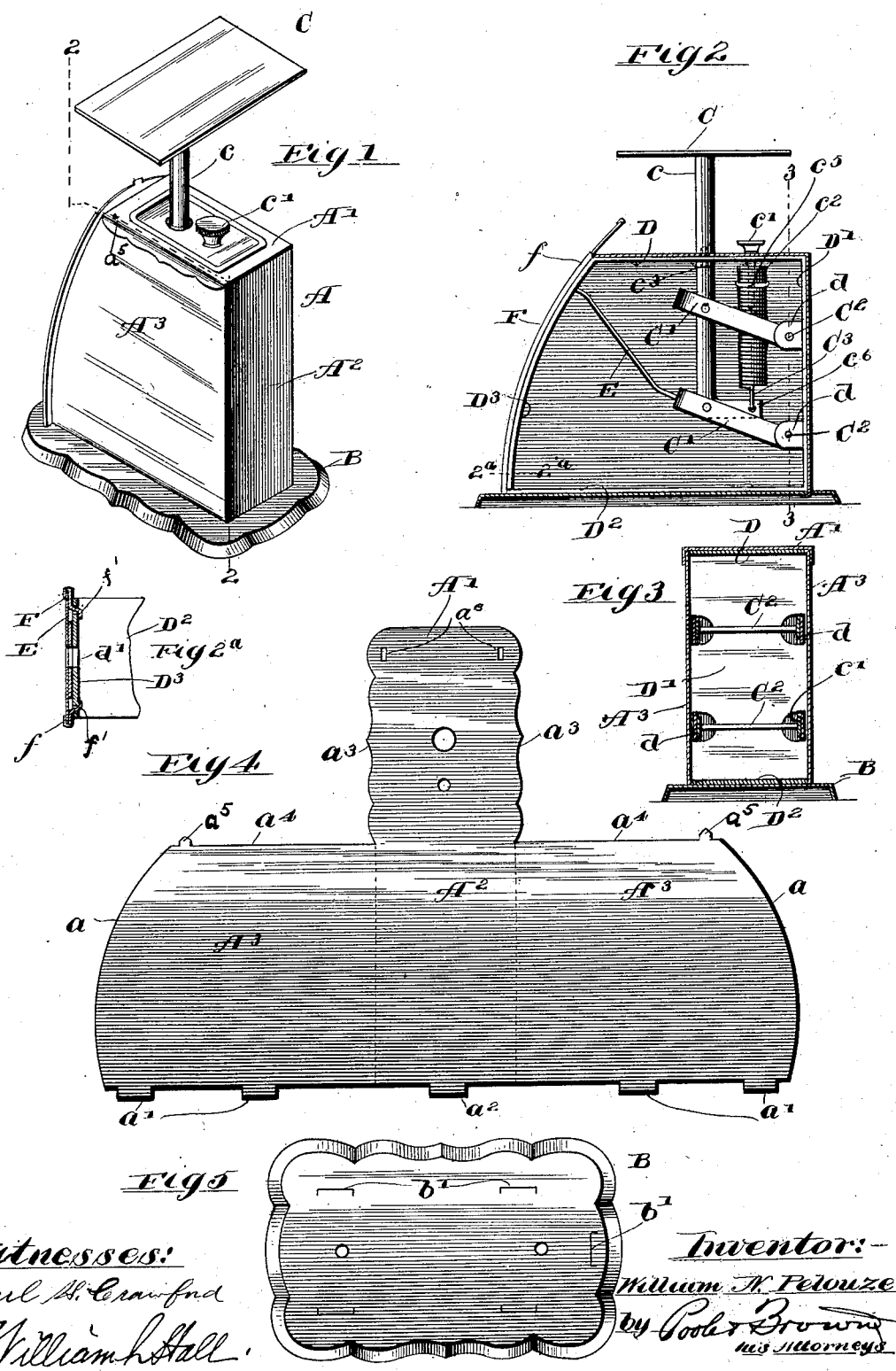
Witnesses:
Carl H. Crawford
William H. Hall
Inventor:
William N. Pelouze
by Poole & Brown
his Attorneys

UNITED STATES PATENT OFFICE.

WILLIAM N. PELOUZE, OF CHICAGO, ILLINOIS, ASSIGNOR TO PELOUZE SCALE AND MANUFACTURING COMPANY, OF CHICAGO, ILLINOIS, A CORPORATION OF ILLINOIS.

BLANK FOR SHEET-METAL SCALE-FRAMES.

SPECIFICATION forming part of Letters Patent No. 722,618, dated March 10, 1903.

Application filed May 7, 1902. Serial No. 106,277. (No model.)

*To all whom it may concern:*

Be it known that I, WILLIAM N. PELOUZE, of Chicago, in the county of Cook and State of Illinois, have invented certain new and useful Improvements in Blanks for Sheet-Metal Scale-Frames; and I do hereby declare that the following is a full, clear, and exact description thereof, reference being had to the accompanying drawings, and to the letters of reference marked thereon, which form a part of this specification.

This invention relates to improvements in weighing-scale frames, and refers more specifically to an improved outer case or shell for such scales and blank for forming the said outer frame or shell, whereby the cost of the scale-frame is cheapened.

The invention consists in the matters hereinafter set forth, and more particularly pointed out in the appended claims.

In the drawings, Figure 1 is a perspective view of a scale having a frame embodying my invention. Fig. 2 is a vertical section taken on line 2 2 of Fig. 1 with the front wall shown in edge elevation. Fig. $2^a$ is a cross-section taken on line $2^a$ $2^a$ of Fig. 2. Fig. 3 is a vertical transverse section taken on line 3 3 of Fig. 2. Fig. 4 is a plan view of the blank from which is made the outer frame, the view illustrating the blank after it has been stamped and before it has been formed or folded. Fig. 5 illustrates the base of the scale-frame, to which the outer frame after being formed is secured.

A complete scale structure is illustrated for the purpose of indicating the manner of connecting the outer frame or shell made in accordance with my invention with the other parts of the scale.

As shown in the drawings, A represents as a whole the outer scale-frame; B, the base; C, the scale-pan; $c$, the scale-pan rod, and $c'$ the adjusting-screw for the spring $c^2$. The scale-pan rod extends into the scale-frame and is pivotally attached to upper and lower loops C' C', which latter are pivoted at their rear ends upon rods $C^2$ $C^2$, which are affixed at their ends in lugs $d$, formed on an inner supporting-frame, as will hereinafter more fully appear. The scale-pan rod is made of two parts and joined at $c^3$ to facilitate the assemblage of the parts of the weighing mechanism, one of the parts of said rod being reduced and the other part being provided with a socket which receives said reduced part, as clearly shown in Fig. 2. The adjusting-screw $c'$ extends through the upper wall of the scale-frame and has screw-threaded engagement at its lower end to a washer $c^5$, which is attached to the spring $c^2$ in the manner shown in Fig. 2. The lower end of the spring is attached to a rearwardly-projecting part $c^6$ of the scale-pan rod, and projecting forwardly and upwardly from the lower loop C' is an indicator-arm E, which extends through the front wall of the casing in a familiar manner and is provided with pointers (not shown) which coöperate with the usual graduated dial on said front wall of the casing.

The frame of the scale consists of three parts—to wit, an outer sheet-metal part A, the blank of which is shown in Fig. 4, the bottom part B, as shown in Fig. 5, and a sheet-metal supporting-frame which is contained within the outer casing and supports the parts of the weighing mechanism described. The blank A consists of an elongated strip of sheet metal which is provided on one of its margins with a prolongation A', which when the blank is bent into the form of the frame constitutes the top wall of the scale-frame. The portion of the blank $A^2$ located in line with the extension A' and between the dotted lines indicated on Fig. 4 constitutes the rear or end wall of the outer frame, while the outer portions $A^3$ of the blank constitute when the blank is folded the side walls of the outer frame, the end margins of said outer parts $A^3$ being curved, as indicated at $a$, to give the proper curvature to the front wall of the outer casing. The blank is shown as provided on its lower margin with five lugs $a'$ $a^2$, two located at either side of the blank and one in the center, and said lugs are adapted to enter, respectively, slitted openings $b$ $b'$ in the base-plate B. After said blank A has been folded into the proper form and the lugs $a'$ $a^2$ have been inserted through said openings $b\ b'$ of the base said lugs are folded or clenched on the under side of the base, and by this means the parts constituting the two side, end, and top walls of the outer frame are securely fastened to the base-plate. When the blank is formed, the margins $a^3$ of the said extension $A'$ are folded over the upper margins $a^4$ of the body of the blank, as shown in Fig. 1. As herein shown, the upper margins $a^4$ of the blank are provided with lugs $a^5$, which are adapted to extend through apertures $a^6$ in the top section $A'$ to secure the top section in place, as shown in Figs. 1 and 4. Said top section may be otherwise secured to the margins of the side sections, as by soldering.

The inner or supporting casing for the weighing mechanism consists of a single piece of sheet metal of a width equal to the width of the interior width of the outer casing and comprising an upper wall D, a rear wall $D'$, a bottom wall $D^2$, and a front curved wall $D^3$, which is provided with a longitudinal slot $d'$ for the passage of the indicator-arm therethrough. The dial E of the scale is fitted to a dial-supporting plate F, which is attached to the front wall $D^3$ of the supporting-casing by means of lugs $f'$, Fig. $2^a$, which extend rearwardly through apertures in the front wall $D^3$ of the inner supporting-frame. Said dial and dial-supporting plate are slotted in line with the slot of the frame member $D^3$ for the passage of the indicator-arm therethrough. The margins of the dial-supporting frame are folded, as shown at $f$, Fig. $2^a$, to form grooves in which fit the margins of the dial. Said outer frame or shell when formed is open at its front, and the supporting-casing formed in the manner described is inserted into said outer casing and fits closely therein, so as to hold the inner frame in place and to brace the outer casing. The lugs $d$ of the inner supporting-frame are cut and turned outwardly from the rear wall $D'$ of the supporting-frame in the manner clearly shown in Fig. 3.

I claim as my invention—

1. A blank for a weighing-scale frame, comprising a sheet adapted to be folded to form the end and two side walls of the frame, said blank being provided in line with the part thereof which constitutes the end wall with an extension which, when folded, constitutes the top wall of the frame and is adapted to be folded down over the top margins of the side walls.

2. A blank for a weighing-scale frame comprising a flat part which is adapted to be folded to form the two sides and one end wall of the frame, said blank being provided in line with the part of the blank which constitutes the end wall with an extension which, when folded, constitutes the top wall of the frame, said extension being apertured to receive, when the frame is formed, the scale-pan rod and the spring-adjusting screw.

3. A blank for a weighing-scale frame having a body adapted to be folded to form the end and the two side walls of the frame, lugs on one margin of the body for attaching the frame to a base, and an extension on the margin of the body opposite said lugs adapted when folded to form the top of the frame, the side margins of said extension being adapted to be secured to the adjacent margins of the sides of the frame.

4. A blank for a weighing-scale frame having a body adapted to be folded to form the end and the two side walls of the frame, lugs on one margin of said body for attaching the frame to a base, and an extension on the margin of the body opposite to said lugs adapted when folded to form the top of the frame, the side margins of said extension being adapted to fold over the adjacent margins of sides of the frame, and said last-mentioned margins being provided with lugs adapted to pass through apertures in said extension and to be clenched on the outer side of said extension.

5. A blank for a weighing-scale frame comprising a flat sheet having the two side parts $A^3\ A^3$, the central part $A^2$, the extension $A'$ adapted to be folded down over the adjacent margins of the parts $A^3\ A^3$, the curved ends $a$ and the lug $a'\ a^2$ on the margin of the sheet remote from said extension.

In testimony that I claim the foregoing as my invention I affix my signature, in presence of two witnesses, this 3d day of May, A. D. 1902.

WILLIAM N. PELOUZE.

Witnesses:
WILLIAM L. HALL,
GERTRUDE BRYCE.